US010834074B2

(12) United States Patent
Jiang et al.

(10) Patent No.: US 10,834,074 B2
(45) Date of Patent: Nov. 10, 2020

(54) PHISHING ATTACK PREVENTION FOR OAUTH APPLICATIONS

(71) Applicant: International Business Machines Corporation, Armonk, NY (US)

(72) Inventors: Jiande Jiang, Taipe (TW); Sheng Hao Wang, Taipei (TW); Chih-Hung Chou, Taipei (TW); Kuo-Chun Chen, Taipei (TW)

(73) Assignee: International Business Machines Corporation, Armonk, NY (US)

(*) Notice: Subject to any disclaimer, the term of this patent is extended or adjusted under 35 U.S.C. 154(b) by 265 days.

(21) Appl. No.: 16/104,626

(22) Filed: Aug. 17, 2018

(65) Prior Publication Data
US 2020/0059466 A1 Feb. 20, 2020

(51) Int. Cl.
*H04L 29/06* (2006.01)
(52) U.S. Cl.
CPC ...... *H04L 63/0838* (2013.01); *H04L 63/1483* (2013.01)
(58) Field of Classification Search
CPC ..................... H04L 63/0838; H04L 63/1483
See application file for complete search history.

(56) References Cited

U.S. PATENT DOCUMENTS

| 7,958,555 | B1* | 6/2011 | Chen ..................... G06F 21/554 |
| | | | 726/22 |
| 8,806,192 | B2 | 8/2014 | Bostanci et al. |
| 8,869,289 | B2 | 10/2014 | Dubhashi et al. |
| 9,311,469 | B2 | 4/2016 | Kobayashi |
| 9,621,355 | B1 | 4/2017 | Ochmanski et al. |
| 9,832,183 | B2* | 11/2017 | Ganesan ................. G06F 21/31 |
| 9,946,874 | B2* | 4/2018 | Ekambaram ........... G06F 21/64 |
| 2007/0055749 | A1* | 3/2007 | Chien ............... H04L 29/12066 |
| | | | 709/219 |
| 2012/0174198 | A1* | 7/2012 | Gould ................... G06F 21/335 |
| | | | 726/6 |
| 2014/0173726 | A1* | 6/2014 | Varenhorst ............ H04L 63/101 |
| | | | 726/22 |
| 2014/0189808 | A1* | 7/2014 | Mahaffey ............ H04L 63/0853 |
| | | | 726/4 |
| 2016/0337854 | A1* | 11/2016 | Afzelius .......... H04W 12/0609 |
| 2019/0057204 | A1* | 2/2019 | Marcovecchio ...... G06F 21/335 |
| 2020/0044868 | A1* | 2/2020 | Vakulenko ............ G06F 21/602 |

* cited by examiner

*Primary Examiner* — Ghodrat Jamshidi

(57) ABSTRACT

An example operation may include one or more of obtaining a request to validate an application with respect to an OAuth provider, identifying a previously registered digital signature of the application, generating verification information of the application based on the identified digital signature of the application, and passing the generated verification information of the application to the OAuth provider via a user login page.

20 Claims, 7 Drawing Sheets

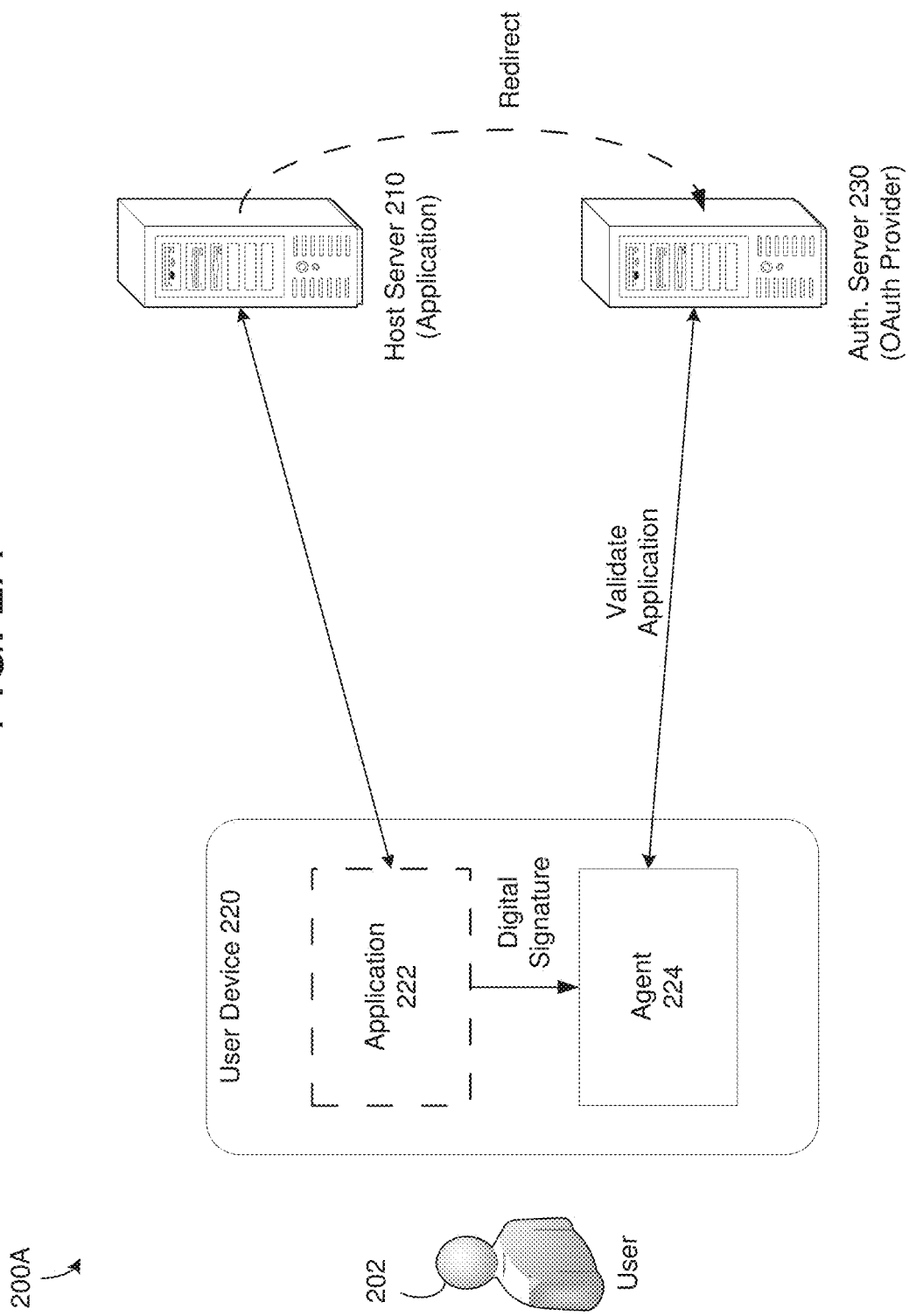

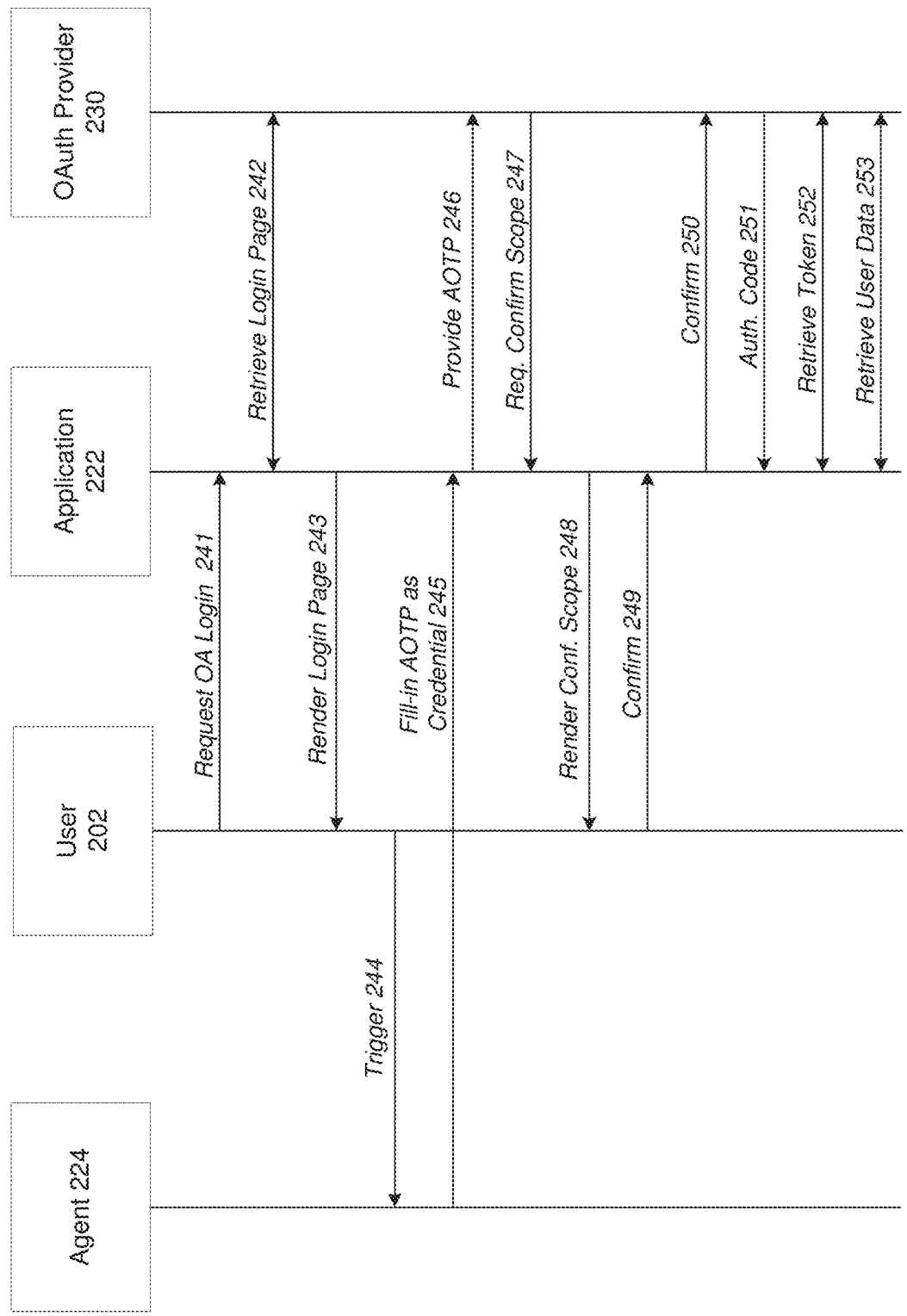

FIG. 3A
Application Login Screen 300
Please Choose Your Login Preference:
 1) Register as New User
 2) Login via OAuth Provider
Redirect
OAuth Screen 310
The Application has been validated. Please Verify Scope to Provide Application:
 1) Address, Phone, etc.
 2) Friends List
FIG. 3B

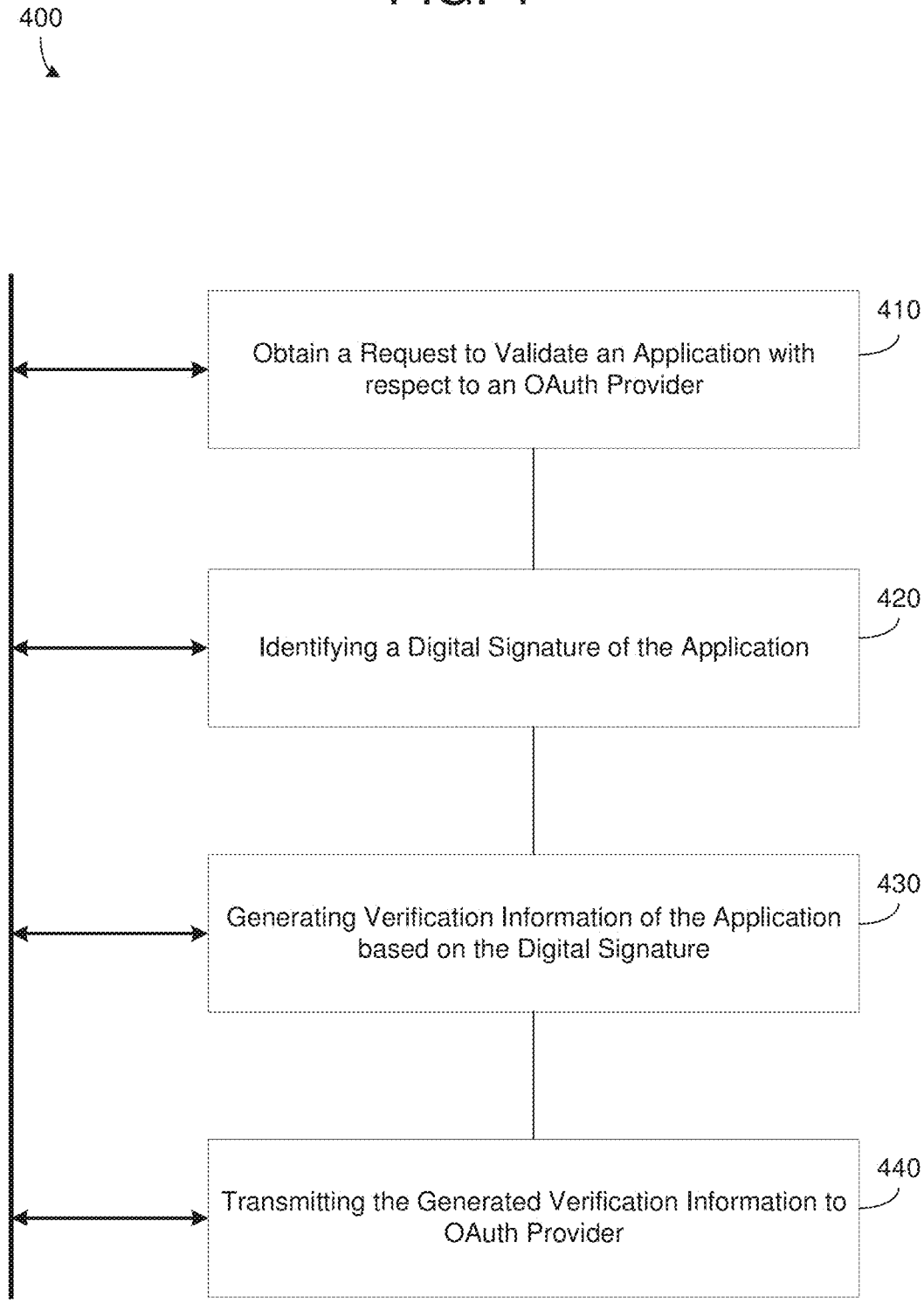

PHISHING ATTACK PREVENTION FOR OAUTH APPLICATIONS

TECHNICAL FIELD

This application generally relates to a system for preventing phishing attacks, and more particularly, to an agent-based system that can authenticate an untrusted client application during an authorization process with an OAuth service provider.

BACKGROUND

Phishing is a form of fraud by which an unauthorized (often malicious) entity attempts to obtain sensitive information such as usernames, passwords, credit card information, and other sensitive information, by disguising as a trustworthy entity in an electronic communication or online environment. The phishing process is typically carried out through spoofing (e.g., email, etc.) or instant messaging which distributes a message containing malicious links (websites) and attachments. Successful phishing messages are difficult to distinguish from authentic messages because they usually appear to be from a well-known entity. When a user selects a link or radio button, the user may be directed to a fake website which appears trustworthy. Even though the phishing site is a fake website it often has a look and feel of a legitimate website with the only difference being the URL. Communications purporting to be from social websites, banks, online payment processors, IT administrators, news organizations, and others, are often used to lure victims to the fake website because these communications appear to be trustworthy.

Open Authentication (OAuth) is an open standard that enables a user to give authority to a third-party client application to access user data that is held by a trusted OAuth service provider. Examples of OAuth service providers include FACEBOOK®, TWITTER®, PAYPAL®, LINKEDIN®, and many others. Typically, a user logs into their OAuth service provider account based on a redirect from the third-party application's website. In this case, the third-party application is trusted to correctly redirect the user (e.g., user's web browser, etc.) from the third-party application (e.g., URL, website, etc.) to a valid login screen of the OAuth service provider. However, the redirect can be subject to phishing attacks. In particular, the third-party application can generate a fake login screen (replacement window) which appears to be the login screen of the OAuth service provider. The fake login screen can be used to solicit login credentials from the user giving the third-party application unauthorized access to the user data and their OAuth service provider account. Accordingly, what is needed is a mechanism for preventing phishing attacks during OAuth login.

SUMMARY

One example embodiment may provide a system that includes one or more of a network interface, and a processor configured to one or more of obtain a request to validate an application with respect to an OAuth provider, identify a previously registered digital signature of the application, generate verification information of the application based on the identified digital signature of the application, and control the network interface to pass the generated verification information of the application to the OAuth provider via a user login page.

Another example embodiment may provide a method that includes one or more of obtaining a request to validate an application with respect to an OAuth provider, identifying a previously registered digital signature of the application, generating verification information of the application based on the identified digital signature of the application, and passing the generated verification information of the application to the OAuth provider via a user login page.

A further example embodiment may provide a non-transitory computer readable medium comprising instructions, that when read by a processor, cause the processor to perform one or more of obtaining a request to validate an application with respect to an OAuth provider, identifying a previously registered digital signature of the application, generating verification information of the application based on the identified digital signature of the application, and passing the generated verification information of the application to the OAuth provider via a user login page.

BRIEF DESCRIPTION OF THE DRAWINGS

FIG. 2A is a diagram illustrating a system for preventing phishing attacks during an OAuth login according to example embodiments.

FIG. 2B is a diagram illustrating a communication process between the components of FIG. 2A during an OAuth login, according to example embodiments.

FIGS. 3A and 3B are diagrams illustrating user interfaces during an OAuth login process according to example embodiments.

FIG. 4 is a diagram illustrating a method of an agent authenticating a third party application according to example embodiments.

DETAILED DESCRIPTION

Figure 1:
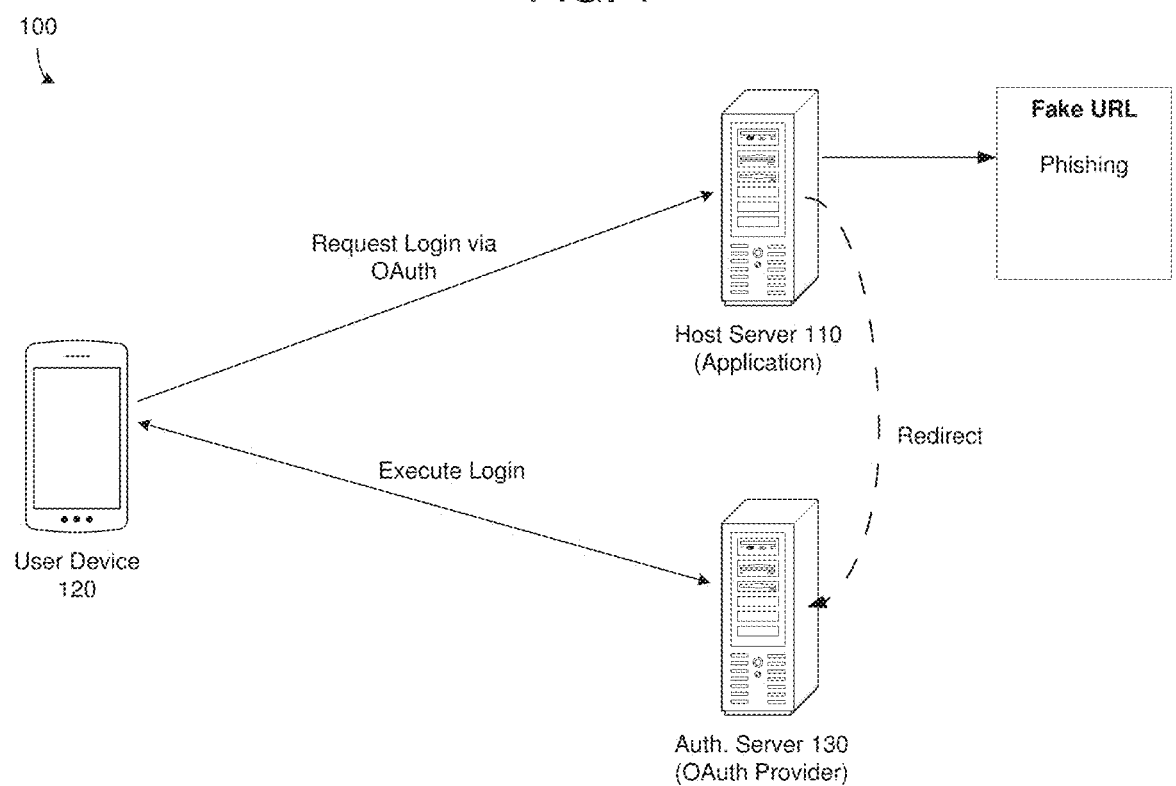
FIG. 1 is a diagram illustrating a system for providing an OAuth login according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Open Authorization (OAuth) is an authorization framework that enables client applications to obtain limited access to user accounts from an HTTP-based OAuth provider service, for example, FACEBOOK®, GITHUB®, TWITTER®, PAYPAL®, and the like. For example, a user may delegate user authentication to a service provider that hosts the user account. The user can authorize third-party client applications to access their data and other information from the user account through the service provider. OAuth provides authorization flows for web and desktop applications, mobile devices, and the like.

Within the OAuth framework there are multiple roles including a resource owner which is referred to herein as the user (or user account), an application (or third-party application) that wants access to the user's account, and an authorization server (OAuth service provider) that hosts the protected user account including the user resources, verifies the identity of the user, and issues access tokens to the client application enabling the client application to access the user account without a user's password or other login credentials from being released. The OAuth provider also includes an application programming interface (API) that fulfills both a resource server role and an authorization server role.

A typical OAuth login process involves a client application redirecting a user to an OAuth provider login page where the user can log into their user account without having to divulge such information directly to the client application. Upon successful login, the user may then delegate access rights to the client application which may be identified by the redirection from the client application. In response, the OAuth provider may provide the application with a token which can be used to access the user's data (rather than give information about the user's login credentials. However, the user must trust that the client application is redirecting their device (or web browser) to a legitimate OAuth login page and not a fake page which can be used for phishing. If the user is sent to a false site, and the user providers their login credentials, the client application may steal the user's login information thereby obtaining unauthorized access to the user's data and other information stored at the OAuth provider.

Example embodiments provide a technical solution to these drawbacks by providing methods, devices, networks and/or systems, which support automated authentication of third-party client applications (e.g., websites, etc.) accessing an OAuth service provider (e.g., OAuth provider websites, etc.) Rather than rely on a user to enter their login credentials (e.g., on a client device) via an OAuth provider login page, an agent (e.g., software program) on the user device may automatically authenticate the client application and provide such notice to the OAuth service provider. For example, the agent may detect that the client application has redirected the user device to a login page of the OAuth provider. In response, the agent may query the client application (e.g., application host server) or otherwise receive a digital signature of the client application which is previously registered with the OAuth provider.

In response to receiving the digital signature, the agent may generate an application-specific one-time password (AOTP) which is unique to the client application. The AOTP may be generated based on one or more of the digital signature, a timestamp, a secret shared with the OAuth provider, and the like. The agent may transmit the AOTP from the user device to the OAuth provider host system. During the redirect, the OAuth provider may receive an ID of the client application within the redirect request. The ID may be used by the OAuth provider to lookup the digital signature of the client application. Likewise, the OAuth provider may generate a corresponding AOTP similar to the process performed by the agent. Furthermore, the OAuth provider may compare the AOTP received from the agent with the generated AOTP to determine if the client application is authentic. In response to authenticating the client application, the OAuth provider may grant access to the third party application based on scope identified by the user.

FIG. 1 illustrates a system 100 for providing an OAuth login to a user device 120 according to example embodiments. Referring to the example of FIG. 1, a host server 110 hosts a client application (also referred to herein as a third-party application) which may be given access to user data stored by OAuth provider server 130 which hosts an OAuth provider service where user device 120 has an account and a registered username, password, PIN, or other secure credentials. In this example, a user (of user device 120) may be using the client application (hosted by host server 110) to login to the user's account hosted by the OAuth service provider (hosted by OAuth provider 130). Although described as applications, the client application 110 and the OAuth provider 130 may be implemented through websites which uniform resource locators (URLs) of respective content.

In this example, the client application 110 may redirect the user device 120 to the login page of the OAuth provider 130. The redirection may include a client ID identifying the client application 110, a scope of the data that the user has given to the client application, and a redirect uniform resource indicator (URI) to redirect user device back to the client application 110 page after successful login at the OAuth provider 130. In response, the user (via the user device 120) may enter their login credentials and pass authentication by the OAuth provider 130. Furthermore, the OAuth provider 130 may ask the user to confirm the scope claimed by the client application. Upon successful confirmation, the OAuth provider 130 may redirect the user back to the client application's page with an authorization code in the URL. Accordingly, the client application 110 may send the authorization code to the OAuth provider 130 and get an access token which can be used to access data of the user of the user device 120 stored and hosted by OAuth provider 130.

However, because the user is required to submit their login credentials after being redirected from the client application 110 to the OAuth provider 130, a phishing attack may occur where the client application 110 replaces a legitimate URL of the OAuth provider 130 with a fake URL which can be used to conduct a phishing attack. In this case, the window/user interface may appear just as the window normally appears from the OAuth provider 130, however, behind the scenes the user information that is entered may go to an unauthorized party instead of the OAuth provider 130.

FIG. 2A illustrates an example of a system that targets a scenario where a client application renders a login page of an OAuth service provider in the client application's user interface and the user cannot tell whether the UI is actually from the OAuth service provider or forged by the application. When the user interface is legitimate, the system shown in FIG. 2A will not stop the normal OAuth flow. Furthermore, the system can prevent a forged login page from ever being provided to the user device thereby preventing login credential from being leaked to an untrusted client application. In particular, the agent-based system can authenticate the client application with the OAuth provider thereby successfully logging in the user without requiring the user to enter their login credentials. The only overhead imposed on original OAuth is that the client application should register a digital signature with the OAuth service provider which can easily be verified during the OA flow without affecting the implementation of client applications that use OAuth service to authenticate.

FIG. 2A illustrates a system 200A for preventing phishing attacks during an OAuth login according to example embodiments, and FIG. 2B illustrates a communication process 200B during an OAuth login, according to example embodiments. According to various embodiments, an agent 224 may be implemented within a user device 220 (e.g., a client device) which wants to give application 222 the ability to access user data stored by and hosted at OAuth provider 230. Here, the user device 220 may be operated by a user 202. The agent 224 may communicate with the OAuth provider 230 through network communications for keeping a secret and timing information up-to-date for generating an AOTP. The agent 224 may also read a digital signature of the application such as from a look-up table, etc. The agent 224 can be produced by the OAuth provider 230. As another example, the agent 224 may be a software program which can serve for multiple OAuth providers instead of being tied to a single OAuth provider. In this case, the agent 224 may be installed as a standalone application, embedded in an operating system of the user device 220, or integrated in any security application.

According to various embodiments, each application such as client application 222 may include a digital signature. The digital signature may be included within the application binary so that other processes such as agent 224 can easily read it without help of the application itself. The digital signature is different from a Client ID and a Client secret provided by OAuth provider 230 while the application 222 registers. The digital signature comes along with the application 222 and may be a hash value representing the application binary and signed by the application provider, so as can be used to verify that this application binary is published by the application provider and integrity ensured. Besides the original OAuth registration, the application provider needs to register with the digital signature of the application in our disclosure.

Referring to FIG. 2B, in 241, the user 202 requests OAuth login via the client application 222. In response, the application 222 may retrieve the OAuth login page from the OAuth provider 230, in 242, and in 243, the application 222 may redirect the browser of the user to the login page of the OAuth provider 230. During the retrieval in 242 the application 222 may provide the OAuth provider 230 with a client ID representing an identifier of the client application 222, a scope of data the client application 222 requests, and a redirect URI to redirect the user's browser back to the client application's page.

According to various embodiments, rather than the user being provided with a login page, or even if the login page is displayed, in 244 the agent 224 is triggered. For example, the agent 224 may be automatically triggered or it may be triggered directly by the user through a button press, etc. In some embodiments, the agent 224 may identify that the login page has been accessed or that a cursor of the user on a screen of the user device 220 is focused on a login credential field (password, username, etc.) and automatically be triggered. The triggering may be based on a request that is obtained such as the request from the user (manual) or a request that is automatically triggered (e.g., cursor position, etc.). In 245, the agent 224 may read the application's digital signature from the application binary, or the like, and verify the application's digital signature. In response, the agent 224 may generate an AOTP from the digital signature if verified, and enter the generated AOTP into the login credentials of the application 222 instead of the user's credentials.

In this example, the agent 224 may obtain the digital signature from the client application 222 by reading the application binary or it may identify the digital signature from a lookup table which stores a plurality of unique digital signature certificates for a plurality of applications, respectively. The agent 224 may generate an AOTP for any OAuth service provider, enabling the user to securely manage a list of OAuth service providers the agent handles. The agent 224 may routinely synchronize OTP-necessary information with each OAuth provider such as secrets (shared with the OAuth providers), and timing, and the like. Furthermore, the ability to verify digital signature is required, no matter by self-implemented or assisted by operating system. In the example of FIG. 2B, the agent may automatically be triggered by security software or the OS based on detection of password input. As another example, the agent may be triggered manually by the user.

In 246, the application 222 provides the AOTP to the OAuth provider 246. Here, the AOTP may be passed to the OAuth provider 246 through the traditional user login page thereby keeping the login process the same (unaffected) by the security protocol described herein. Upon receiving the AOTP credentials, the OAuth provider 230 may generate a corresponding AOTP' from the digital signature of the client application based on the client ID received from the application 222 in 244, compares the generated AOTP' with AOTP from the agent, and grant a login session with permission only can confirm scope. The AOTP and the AOTP' may be generated based on the digital signature of the application 222, a shared secret between the agent 224 and the OAuth provider 230, a timestamp, and the like. The client ID (or application identifier) that is provided from the application 222 to the OAuth provider 230 may be a public identifier and can be spoofed. However, a shared secret between the agent 224 and the OAuth provider 230 which is used to generate the AOTP and the AOTP' and has no way to be spoofed by the application 222. Furthermore, the digital signature is used instead to verify that the application 222 is exactly the one registered.

In 247-250, the OAuth provider 230 asks the user to confirm the scope claimed by the client application 222. In some embodiments, the scope may be based on a session login with limited permissions instead of full permissions. For example, the AOTP generated from the application's digital signature may identify that the session is to be granted with a limited permission, which means the session can only perform scope confirmed by the user. As another example, the session may include full access permissions which gives the application 222 the ability to change all user information such as passwords, login, etc. In 251, the OAuth provider 230 redirects the user back to the application's page with an authorization code in the URL. The application 222 may send the authorization code to the OAuth provider 230 and receive an access token, in 252. Accordingly, in 253 the application retrieves user data from the OAuth provider 230 based on the access token that identifies user.

In some embodiments, the user may interact with the agent during the authorization process. For example, the agent may be triggered by the user manually (optional). As another example, the user may choose one of the OAuth service providers from among a plurality of OAuth providers handled by the agent. After the agent fills in the AOTP credential, the user may select the login button in the 3rd party application UI. The agent may insert the AOTP for verifying the application into the login credentials fields for a user within an OAuth login page. Accordingly, the traditional login screen and mechanism is not affected by the example embodiments.

According to various embodiments, the OTP and AOTP reduce the risk of a password being stolen. The OTP prevents the attacker from reusing stolen password after a time period. The AOTP even more stops the attacker from reusing stolen password to attack user's account on services provided by other client applications.

At various stages during the authorization process an application can be determined to be suspicious. At any of these points, the authorization process can be terminated, or a warning can be provided to the user (e.g., via a pop-up, etc.). For example, an application may be detected as fraudulent or suspicious when the agent verifies (or is unable to verify) the digital signature. As another example, an application may be detected as fraudulent or suspicious when the OAuth provider verifies (or is unable to verify) the client identifier of the application. As another example, an application may be detected as fraudulent or suspicious when the OAuth service provider receives a request other than to confirm scope from a session with limited permission. In some embodiments, the agent can pop out the warning message. As another example, the OAuth service provider can send warning email to user, block and/or suspend the OAuth client ID provided to a suspicious 3rd party application, and the like.

FIG. 3A illustrates an example of a user interface 300 of a client application where a user selects a request to login via the OAuth provider. Here, the user may request to login to the OAuth provider causing the application (or application server) to redirect the user interface of the application 300 to the OAuth screen 310 of the OAuth provider shown in FIG. 3B. However, rather than require the user to enter credentials, the agent may validate the digital signature of the application from the application binary and generate an AOTP which can be used as a login credential via the OAuth login page. For example, the agent may insert a OTP or AOTP into the login page and pass the AOTP to the OAuth provider. Accordingly, the next screen shown to the user may be the OAuth screen 310 requesting the user to confirm the scope of access given to the client application, after the client application has been successfully authenticated by the agent and the OAuth provider. Examples of the scope that may be given to the client application include contact information of the user (email, phone, address, etc.), friends lists, images, message, content, blogs, etc. which are stored by the OAuth provider.

FIG. 4 illustrates a method 400 of an agent authenticating a third party application during an authorization process with an OAuth provider, according to example embodiments. For example, the method 400 may be performed by an agent that is running on a user device which is accessing a client application. As another example, the method 400 may be performed by another computing system such as a cloud platform, a database, and the like. Referring to FIG. 4, in 410, the agent is triggered or otherwise identifies that a validation process needs to be performed. That is, the agent may be triggered to perform an application validation. For example, the agent may be triggered by a user or it may automatically trigger in response to detecting a cursor on the screen approaching a user login field, etc.

In 420, the method may include identifying a digital signature of the application, and in 430, generating verification information of the application based on the identified digital signature of the application. For example, the digital signature of the application may be previously registered with the OAuth provider such as during a registration process between the application and the OAuth provider. In some embodiments, the identifying may further include validating the application based on signature data stored in a table that includes valid signatures of a plurality of applications previously registered with the OAuth provider. In some embodiments, the verification information generated by the agent may be a one-time password such as a unique application-specific one-time password, also referred to herein as a AOTP. For example, the AOTP may be generated based on a shared secret that is shared between the agent and the OAuth provider, a timestamp at which the application signature was generated, and the application signature. For convenience, the shared secret can be an original password of the user account on the OAuth provider, but is not limited thereto.

In 440, the method may include transmitting the generated verification information to the OAuth provider. Here, the generated verification information may be used to authenticate the client application with the OAuth provider. In some embodiments, the generated verification information may be transmitted to the OAuth provider in association with a request to grant the application access to user data stored at the OAuth provider. The generated verification information may be filled into the login screen by the agent and passed to the OAuth provider through the login screen (by the application) to the OAuth provider, thereby leaving the login mechanism intact. The AOTP may be used just like the original credential to be filled into the application and can tolerate risk of being stolen since a session login by an AOTP can only perform scope confirmation in a OAuth flow related to the client ID belonging to the application which registered to the OAuth provider with the digital signature used to generate the AOTP.

Figure 5:
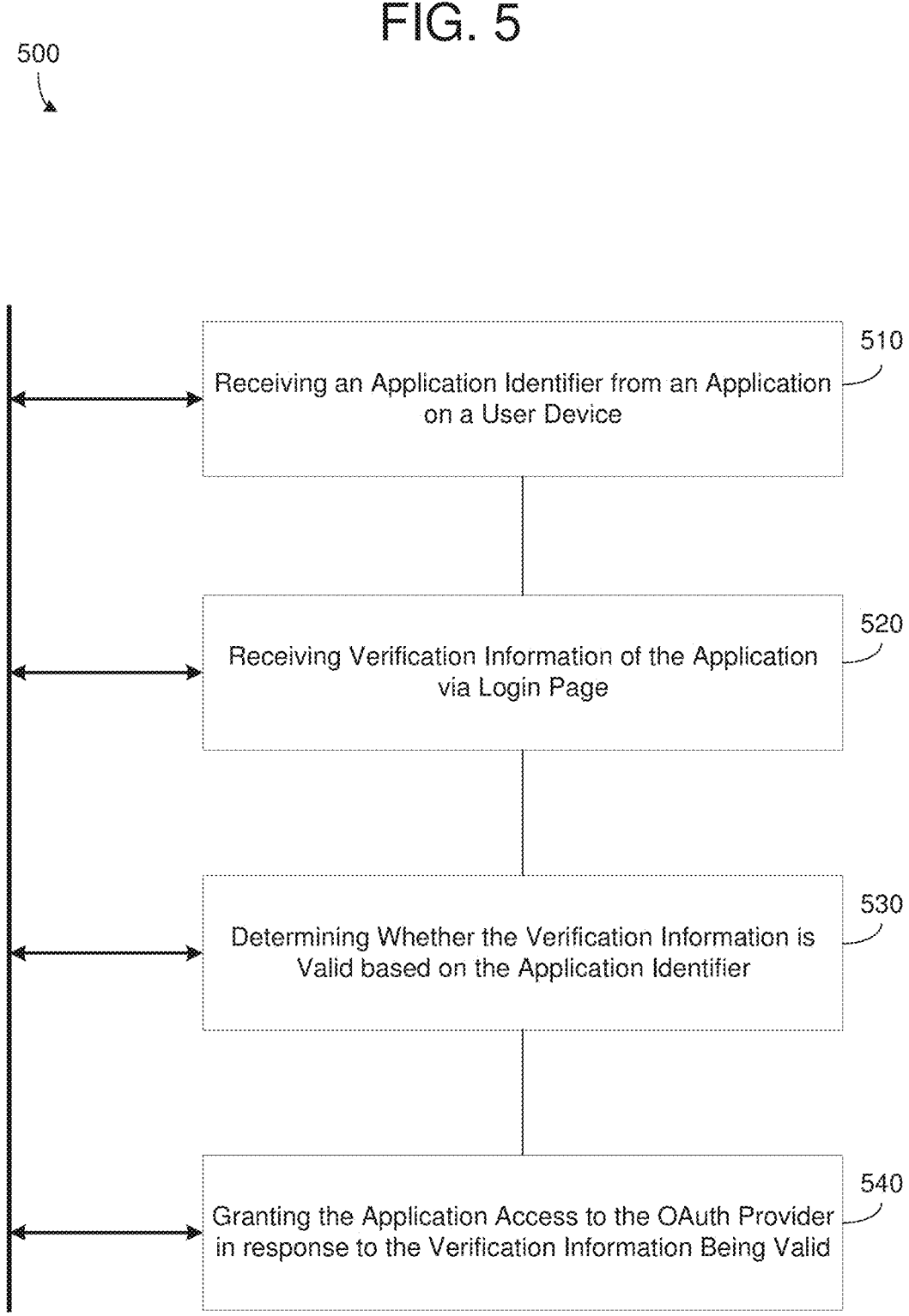
FIG. 5 is a diagram illustrating a method of an OAuth provider authenticating a third party application according to example embodiments.

FIG. 5 illustrates a method 500 of an OAuth provider authenticating a client application according to example embodiments. For example, the method 500 may be performed by a host server of an OAuth service provider, a web server, a database, or the like. As another example, the method 400 may be performed by another computing system such as a user device, a cloud platform, a database, and the like. Referring to FIG. 5, in 510, the method may include receiving an application identifier from an application executing on a client device during a redirect to an OAuth provider. For example, the application identifier may include a client ID of the application that uniquely identifies the application from among a plurality of applications that have registered with the OAuth provider.

In 520, the method may include receiving verification information of the application generated by an agent which can be passed through the OAuth provider login page. Here, the verification information may be added to the field by the agent and passed through to the OAuth provider in a traditional mechanism.

In 530, the method may include determining whether the verification information received from the application is authentic based on the application identifier, and in response to the verification information being authenticated, in 540, grant the application access to previously stored user data pf the OAuth provider. In some embodiments, the determining may include generating a corresponding application identifier based on the verification information received from the application and determining whether the generated application identifier is the same as the application identifier received from the agent.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
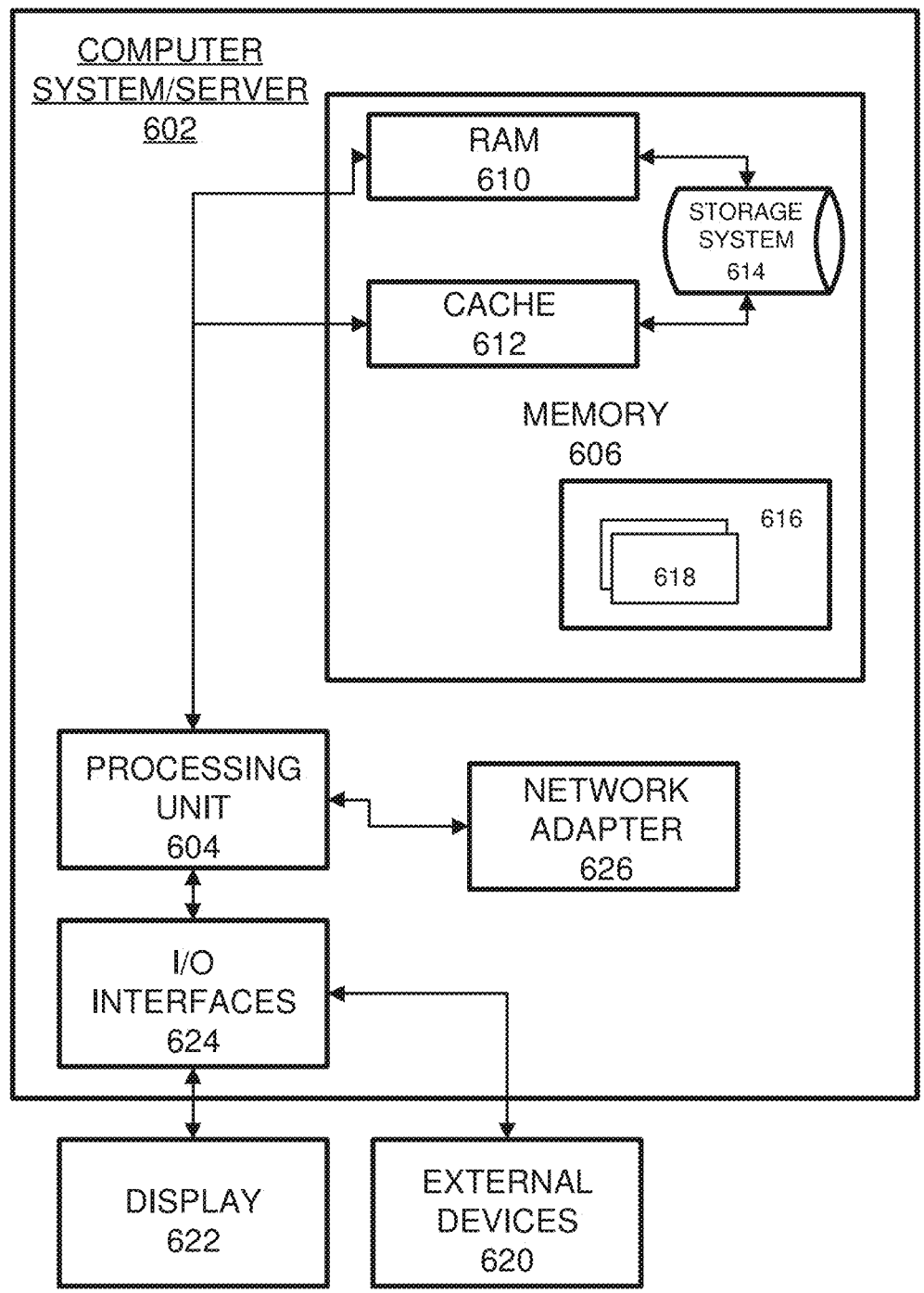
FIG. 6 is a diagram illustrating a computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove. For example, the computing node 600 may be a network server of a larger enterprise network that connects multiple user workstations to the Internet, a private network, or the like.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units (processor) 604, a system memory 606, and a bus that couples various system components including the system memory 606 to the processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624 (which may be referred to herein as an output and/or an input). Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

According to various embodiments, the computing system 602 may implement an agent such as the agent 224 shown in FIG. 2A. The processor 604 may recognize or otherwise identify a request to log into an OAuth provider associated with a redirect from an application to the OAuth provider. In this example, the processor 604 may identify a digital signature of the application and generate verification information of the application based on the identified digital signature of the application. Here, the verification information may include a OTP or an AOTP that is generated based on a shared secret with the OAuth provider, a timestamp, and the digital signature of the application. Furthermore, the processor 604 may control the network interface 626 to transmit the generated verification information to the OAuth provider. In doing so, the processor 604, via the agent execution, may generate authentication information of the client application which can be verified by the OAuth provider.

In another example embodiment, the computing system 602 may implement an OAuth service provider. In this example, the network interface 626 may receive an application identifier from an application executing on a client device during a redirect to an OAuth provider, and receive verification information of the application generated by an agent executing on the client device. The verification information may include the OTP or the AOTP generated by the agent. The processor 604 may determine whether the verification information received from the agent is authentic based on the application identifier received from the application, and in response to the verification information being authenticated, grant the application access to previously stored user data pf the OAuth provider.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
a network interface; and
a processor configured to obtain a request to validate an application with respect to an OAuth provider, identify a previously registered digital signature of the application, and generate verification information of the application based on the identified digital signature of the application,
wherein the processor is further configured to: control the network interface to pass the generated verification information of the application to the OAuth provider via a user login page and generate a unique application-based one-time password based on a shared secret with the OAuth provider and the application signature.

2. The computing system of claim 1, wherein the processor is configured to trigger the request in response to a detection of a cursor position on a password field of the login page of the OAuth provider.

3. The computing system of claim 1, wherein the processor is further configured to transmit the generated verification information to the OAuth provider via a user credential field of the login page of the OAuth provider.

4. The computing system of claim 1, wherein the processor is configured to generate the one-time password based on the application signature.

5. The computing system of claim 1, wherein the processor is configured to generate the unique application-based one-time password based on a timestamp.

6. The computing system of claim 1, wherein the generated verification information is transmitted to the OAuth provider in association with a request to grant the application access to user data stored at the OAuth provider.

7. The computing system of claim 1, wherein the processor is further configured to validate the application based on signature data stored in a table that includes valid signatures of a plurality of applications previously registered with the OAuth provider.

8. The computing system of claim 1, wherein the generated verification information of the application is transmitted for a user login associated with the request instead of transmission of user login credentials.

9. A method comprising:
obtaining a request to validate an application with respect to an OAuth provider;
identifying a previously registered digital signature of the application;
generating verification information of the application based on the identified digital signature of the application; and
passing the generated verification information of the application to the OAuth provider via a user login page;
wherein a unique application-based one-time password is generated based on a shared secret with the OAuth provider and the application signature.

10. The method of claim 9, wherein the method further comprises triggering the request in response to a detection of a cursor position on a password field of the login page of the OAuth provider.

11. The method of claim 9, further comprising transmitting the generated verification information to the OAuth provider via a user credential field of the login page of the OAuth provider.

12. The method of claim 9, wherein the generating the verification information comprises generating the one-time password.

13. The method of claim 9, wherein the generating the verification information comprises generating the unique application-based one-time password based on a timestamp.

14. The method of claim 9, wherein the generated verification information is transmitted to the OAuth provider in association with a request to grant the application access to user data stored at the OAuth provider.

15. The method of claim 9, wherein the identifying further comprises validating the application based on signature data stored in a table comprising valid signatures of a plurality of applications previously registered with the OAuth provider.

16. The method of claim 9, wherein the generated verification information of the application is transmitted for a user login associated with the request instead of transmitting user login credentials.

17. A non-transitory computer readable medium comprising instructions, that when read by a processor, cause the processor to perform a method comprising:
obtaining a request to validate an application with respect to an OAuth provider;
identifying a previously registered digital signature of the application;
generating verification information of the application based on the identified digital signature of the application; and
passing the generated verification information of the application to the OAuth provider via a user login page;
wherein a unique application-based one-time password is generated based on a shared secret with the OAuth provider and the application signature.

18. The non-transitory computer readable medium of claim 17, wherein the generated verification information of the application is transmitted for a user login associated with the request instead of transmitting user login credentials.

19. The non-transitory computer readable medium of claim 17, wherein the method further comprises triggering the request in response to a detection of a cursor position on a password field of the login page of the OAuth provider.

20. The non-transitory compute readable medium of claim 17, wherein the generating the unique application-based one-time password based on a timestamp.

* * * * *